(12) United States Patent
Butler et al.

(10) Patent No.: US 7,410,538 B2
(45) Date of Patent: *Aug. 12, 2008

(54) GRANULATED HYDROPHOBIC ADDITIVE FOR CEMENTITIOUS MATERIALS

(75) Inventors: Derek Butler, Barry (GB); Frederic Gubbels, Houtain le Val (BE)

(73) Assignee: Dow Corning Corporation, Midland, MI (US)

( * ) Notice: Subject to any disclaimer, the term of this patent is extended or adjusted under 35 U.S.C. 154(b) by 79 days.

This patent is subject to a terminal disclaimer.

(21) Appl. No.: 10/398,325

(22) PCT Filed: Sep. 20, 2001

(86) PCT No.: PCT/GB01/04188

§ 371 (c)(1), (2), (4) Date: Oct. 8, 2003

(87) PCT Pub. No.: WO02/30846

PCT Pub. Date: Apr. 18, 2002

(65) Prior Publication Data

US 2005/0098062 A1  May 12, 2005

(30) Foreign Application Priority Data

Oct. 7, 2000  (GB) ................. 0024638.9

(51) Int. Cl.
C04B 24/42 (2006.01)
C04B 11/00 (2006.01)
C04B 103/65 (2006.01)
C08J 3/12 (2006.01)

(52) U.S. Cl. ............... 106/806; 106/2; 106/665; 106/781; 106/801; 106/810; 106/823; 524/267

(58) Field of Classification Search .......... 106/2, 106/806, 810, 665, 781, 801, 823; 524/267
See application file for complete search history.

(56) References Cited

U.S. PATENT DOCUMENTS

| 3,455,710 | A | * | 7/1969 | Nitzsche et al. ............ 106/781 |
| 4,092,441 | A | * | 5/1978 | Meyer et al. ................ 427/453 |
| 4,411,702 | A | * | 10/1983 | Makino et al. ............. 106/781 |
| 4,455,172 | A | | 6/1984 | Kerserho |
| 4,643,771 | A | * | 2/1987 | Steinbach et al. .......... 106/678 |
| 4,704,416 | A | * | 11/1987 | Eck et al. ..................... 524/17 |
| 4,851,047 | A | * | 7/1989 | Demlehner et al. ............ 524/4 |
| 4,880,898 | A | * | 11/1989 | Wahle et al. ................ 528/272 |
| 4,975,122 | A | * | 12/1990 | Parkinson et al. ........... 106/727 |
| 5,104,447 | A | * | 4/1992 | Stewart et al. .................. 106/2 |
| 5,108,511 | A | * | 4/1992 | Weigland ..................... 106/728 |
| 5,238,596 | A | * | 8/1993 | Smith ......................... 510/441 |
| 5,336,715 | A | | 8/1994 | Sejpka et al. |
| 5,589,222 | A | * | 12/1996 | Thometzek et al. ......... 427/215 |
| 5,747,561 | A | * | 5/1998 | Smirnov et al. ............. 523/212 |
| 5,766,323 | A | * | 6/1998 | Butler et al. .................... 106/2 |
| 6,020,403 | A | * | 2/2000 | Eck et al. ..................... 523/340 |
| 6,106,607 | A | * | 8/2000 | Be et al. ....................... 106/781 |
| 6,268,423 | B1 | * | 7/2001 | Mayer et al. ................ 524/492 |
| 6,323,268 | B1 | * | 11/2001 | Fisher et al. ................ 524/266 |
| 6,761,765 | B2 | * | 7/2004 | Lu ............................... 106/823 |
| 7,022,800 | B2 | * | 4/2006 | Tachikawa et al. ........... 528/17 |
| 7,311,770 | B2 | * | 12/2007 | Windridge et al. .......... 106/781 |

FOREIGN PATENT DOCUMENTS

| EP | 0067074 | | 12/1982 |
| EP | 461738 A1 | * | 12/1991 |
| EP | 0811584 | | 10/1997 |
| GB | 782111 | | 9/1957 |
| GB | 873804 | | 7/1961 |
| GB | 938567 | | 10/1963 |
| JP | 49-60326 A | * | 6/1974 |
| JP | 54-11931 A | * | 1/1979 |
| JP | 2981614 B1 | * | 9/1999 |
| WO | 9928264 | | 6/1999 |

OTHER PUBLICATIONS

Derwent Abstract No. 1999-133033, abstract of Chinese Patent Specification No. 1197822A (Nov. 1998).*
Derwent Abstract No. 1997-078043, abstract of Chinese Patent Specification No. 1077975A (Nov. 1993).*
Derwent Abstract No. 1997-087903, abstract of Chinese Patent Specification No. 1078245A (Nov. 1993).*
Derwent Abstract No. 1994-300715, abstract of Soviet Union Patent Specification No. 1100823 A1 (Feb. 1994).*

* cited by examiner

Primary Examiner—Anthony J Green
(74) Attorney, Agent, or Firm—Howard & Howard Attorneys, P.C.

(57) ABSTRACT

A cementitious material in powder form comprising cement, also comprises sufficient of a granulated hydrophobing additive, which comprises form 5 to 15 parts by weight of an organopolysiloxane component, form 10 to 50 parts by weight of a water-soluble or water-dispersible binder and from 50 to 90 parts by weight of a carrier particle, to give from 0.01 to 5% by weight of the organosiloxane component based on the weight of the cement. The cementitious material displays good hydrophobicity, which may improve upon subsequent wettings of the applied cementitious material to a substrate.

19 Claims, No Drawings

GRANULATED HYDROPHOBIC ADDITIVE FOR CEMENTITIOUS MATERIALS

The present invention relates to cementitious materials, which exhibit a hydrophobic character. The invention also relates to a process for making cementitious materials hydrophobic.

It has, for a long time, been desirable for cementitious materials, which have been applied to a substrate, such as an external wall, to be, to some extent hydrophobic. A number of solutions have been suggested in the past including the post-treatment of previously applied cementitious material and the addition of hydrophobing additives to cementitious materials prior to their application to a substrate. In the most common situations hydrophobing additives are added immediately prior to or during the process of applying the cementitious material to a substrate. It is, however, preferred to provide a cementitious material which has incorporated therein a hydrophobing agent or additive prior to application to a substrate, even more preferably at the stage where the cementitious material is in a dry, powdery form.

EP 0811584 describes a granulated hydrophobing additive in cement. The granulated additive comprising an active organopolysiloxane component, a water-soluble or water dispersible binder and water-soluble, water-insoluble or water dispersible carrier particles. The additive is readily dispersible in cementitious materials upon the addition of water due to the non-hydrophobic nature of the granules. All of the carrier particles identified as suitable for this purpose were inactive and wettable in water, e.g. calcium carbonate. The use of this organopolysiloxane hydrophobing agent provides excellent hydrophobic properties to cementitious materials. However, the effectiveness of the hydrophobic properties were observed to increase with each wetting of the applied cementitious material, particularly when the binder and carrier were water soluble materials, and as such provided limited initial hydrophobic protection when compared with traditional hydrophobers used in the industry such as metal soaps.

Hence, there still remains the problem of how to obtain substantially immediate hydrophobicity in the applied cementitious material.

There are a wide variety of water-repellent or hydrophobic compounds, the majority of which are oily or waxy compounds such as hydrolysable oils, mineral oils and in particular metal soaps, i.e. metal salts of C12 to C20 fatty acids such as stearates and oleates, (Lea's Chemistry of Cement and Concrete, 4$^{th}$ Ed. P. C Hewlett (Ed.), pub. Arnold, 1988, pp 883-887. The metal soaps may be divided into two groups:— i) Alkali metal soaps and the like such as sodium stearate, potassium stearate and other salts such as ammonium stearate which are monovalent and water soluble. These compounds are thought to provide water repellency by reacting with alkali earth metal ions, particularly calcium ions, in the cementitious material to form strongly hydrophobic alkali earth stearate salts.

ii) Alkaline earth and transition metal stearates. These may be introduced into pre-formed cementitious materials in a pulverised form. In this instance it is intended for the stearates to block the open pores in formed concrete so as to repel ingressing water. One significant problem in the latter method is that whilst the strongly hydrophobic properties of the Alkaline earth and transition metal soaps are effective to cause water repellency they are very difficult to mix into aqueous cementitious mixtures to gain good spread throughout the cementitious material and it is very difficult to incorporate a sufficient amount of stearate salt into the cementitious mixture because of this hydrophobic nature. It has been found that hydrophobers of this type will migrate away from the source of water and as such can be found to concentrate at the cementitious material/air interface rather than to be dispersed throughout the body of the set cementitious material. Lea, (ibid. pp 886) recommends that dosages of stearates exceeding 0.2 by weight of cement are not recommended in order to avoid the likelihood of significant strength loss.

WO 99/28264 describes a waterproofing additive for cement and/or concrete comprising a pozzolanic material e.g. silica fume modified with one or possibly two waterproofing additives selected from a long chain paraffinic acid, a paraffinic or fatty acid ester and a metallic soap of a paraffinic acid. Both EP 0811584 and WO 99/28264 teach the need for a carrier particle in combination with a hydrophobic particle. GB938567 describes a dry powdered admixture comprising cement, an inert particulate solid filler, an accelerator and a water soluble vinyl alcohol polymer.

Another development has been disclosed in EP 228657 in which a water re dispersible powder composition is disclosed which contains a water-soluble polymer and at least 30% by weight of an organic silicone compound. This water dispersible powder composition is manufactured by spray-drying using an emulsion or a suspension of the composition. The water dispersible powders are said to be useful as additives e.g. for plasters, hydraulic binders such as cement, clay or pigment and in water diluted form for rendering bulk materials water repellent. It is stated in the specification that the silicone containing water redispersable powder can be mixed in dry form with other powders before being sent to the end user. One of the applications of these water dispersible powders is for rendering a material hydrophobic.

Although the prior art has provided useful ways of rendering cementitious or other materials hydrophobic there is always a desire for further improvements in this area. We have now found that if metal soap containing additives are made in a specific way, i.e. by granulation, an improvement in hydrophobicity can be imparted to cementitious materials and the hydrophobing agent is dispersed throughout a set cementitious material such as concrete.

According to a first aspect of the invention, there is provided a granulated hydrophobing additive comprising the following components:—

A), from 50 to 90 parts by weight of one or more palmitic, stearic or oleic acid salt(s) of ammonia, aluminium, alkali metals, alkaline-earth metals or transition metals and/or an organic ester of one or more palmitic, stearic or oleic acid or a mixture of said salts and esters.

B), from 20 to 50 parts by weight of a water-soluble or water-dispersible binder and C), from 0 to 20 parts by weight of an organopolysiloxane a granulated hydrophobing additive.

It is to be understood that the concept "comprising" where used herein is used in its widest sense to mean and to encompass the notions of "include", "comprehend" and "consist of".

The palmitic, stearic or oleic acid salt(s) of ammonia, alkali metals, alkali-earth metals or transition metals or a mixture thereof may be selected from palmitic, stearic or oleic acid salts of zinc, iron, copper, barium, calcium, magnesium, lithium, sodium, potassium, aluminium and ammonia and is preferably selected from ammonium stearate, sodium stearate, lithium stearate, potassium stearate, magnesium stearate, calcium stearate, barium stearate, zinc stearate, aluminium tri stearate, aluminium-di-stearate, aluminium mono stearate, copper stearate, sodium oleate and potassium oleate, calcium oleate and zinc oleate. The ester is preferably butyl stearate. Most preferably the salt is zinc stearate or calcium stearate. Least preferred of the metal stearates are the alkali metal stearates as residual alkali metal cations in set cementitious material are known to cause efflorescence therein.

It is to be understood that the meaning of stearate should be construed to be anything from a 100% stearate salt where all anions are stearate anions to a commercially available stearate which tends to be a mixture, substantially of the salts of stearic and palmitic acids.

The second essential ingredient of the granulated hydrophobing additive is a water-soluble or water-dispersible binder material. Such materials are known in the literature and have been described in a number of publications. They are preferably materials which at room temperature, i.e. from 20 to 25° C., have a waxy, highly viscous or solid consistency and have a melting point of from 25 to 150° C. Examples of suitable water-soluble or water-dispersible binder materials include polyvinyl alcohol, methyl cellulose, carboxy methyl cellulose, ethoxylated fatty alcohols and mixtures thereof with fatty acids and fatty acid esters and other film forming polymers. It is preferred that the binder material is actually water soluble. Most preferably the water solubility should be such that it does not interfere with the hydration process of the cementitious material when water is introduced prior to its application or use. Preferred binders are ethoxylated fatty alcohol based waxes. However, when an organopolysiloxane component is present in the system, the most preferred binders are ethoxylated fatty alcohol wax/$C_{16-20}$ fatty acid mixtures. This is because it has been found that the incorporation of, for example, stearic acid or the like in appropriate amounts, results in the control of the rate of solubility of the organopolysiloxane component in water. Hence, when cementitious material has been set in place and is subsequently wetted the presence of a fatty acid such as stearic acid is potentially a means of controlling the rate of release of the encapsulated organopolysiloxane component from the granules.

The preferred fatty acid is stearic acid. The ethoxylated fatty alcohol wax/stearic acid mixtures comprise from 10 to 90% by weight of each constituent. At least 10% by weight of the wax must be present in a mixture of this type as stearic acid alone is insoluble in water. Preferably the binder comprises from 35 to 70% by weight of ethoxylated fatty alcohol wax, the remainder being stearic acid. Typically the mixture contains between about 40 to 60% by weight of ethoxylated fatty alcohol wax, however, it is to be appreciated that the actual composition for the binder varies dependent on the organopolysiloxane component being utilised in the granule. An example of a preferred ethoxylated fatty alcohol wax is Lutensol® AT 80 from BASF and a preferred ethoxylated fatty alcohol wax/fatty acid mixture is Emulan® 40/60 which is a 40/60 mixture of ethoxylated fatty alcohol wax and $C_{16-22}$ fatty acids (substantially stearic acid).

The optional organopolysiloxane component may be chosen from any known organopolysiloxane materials, i.e. materials which are based on a Si—O—Si polymer chain and which may comprise mono-functional, di-functional, tri-functional and/or tetra-functional siloxane units, many of which are commercially available. It is preferred that the majority of siloxane units are di-functional materials having the general formula $R_2SiO_{2/2}$, wherein each R independently denotes an organic component or an amine, hydroxyl, hydrogen or halogen substituent. Preferably R will be selected from hydroxyl groups, alkyl groups, alkenyl groups, aryl groups, alkyl-aryl groups, aryl-alkyl groups, alkoxy groups, aryloxy groups and hydrogen. More preferably a substantial part, most preferably at least 80% of the R substituents will be a combination of alkyl groups having from 1 to 12 carbon atoms most preferably methyl or ethyl groups.

Although it is preferred that the majority of siloxane units are di-functional siloxane units other units such as tri-functional or tetra-functional units may also be present resulting in the polymer chain exhibiting a certain amount of branching. Although resinous siloxane materials may also be used, it is preferred that the tri-functional or tetra-functional siloxane units should not exceed 10% of the total number of siloxane units thereby limiting the amount of branching that is taking place at the polymer level. More preferably no more than about 1% siloxane units causing branching should be present in the polymer. In addition to the potential branching units there will also be present a number of mono-functional siloxane units. These will be used as end-capping or end-blocking units for the polymer and preferably have the formula —$O_{1/2}$SiR$_3$ wherein R is as defined above, but preferably being hydroxyl or a $C_{1-6}$ alkyl group, most preferably methyl or ethyl.

The total number of siloxane units is preferably such that the organopolysiloxane material has a viscosity of from 50 to a maximum of about 60,000 mm$^2$/s at 25° C. More preferably the viscosity of the siloxane should not exceed about 5,000 mm$^2$/s at 25° C. The more preferred organopolysiloxane materials have the general formula

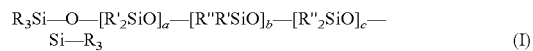

$$R_3Si—O—[R'_2SiO]_a—[R''R'SiO]_b—[R''_2SiO]_c—Si—R_3 \qquad (I)$$

wherein each R substituent is as defined above, each R' substituent is hydroxyl, OR''' where R''' is a hydrocarbon group with 1 to 6 carbon atoms, hydrogen, or substituted hydrocarbon group, e.g. amino or epoxy-substituted hydrocarbon group and R'' is an organopolysiloxane chain of the formula O—[R'$_2$SiO]$_x$—SiR$_3$. a is an integer, b, c and x are zero or integers whereby the total of b+c is no more than 5% of the total of a+b+c+x. Most preferably b, c and x are 0. Preferably each R group is a hydroxyl group or hydrocarbon group with 1 to 6 carbon atoms, most preferably methyl. Preferably at least 80% of all R' groups are alkyl groups having from 1 to 6 carbon atoms, e.g. methyl, ethyl or isopropyl, most preferably methyl.

Up to 10% of the weight of the organopolysiloxane component may be replaced by an organosilane, with a minimum of two Si—OX where X is hydrogen, a hydrocarbon group with 1 to 6 carbon atoms, or a substituted hydrocarbon group, e.g. amino or epoxy-substituted hydrocarbon group. Preferred organosilanes are methyltrimethoxysilane and ethylenediaminetrimethoxysilane.

The granulated hydrophobing additive preferably comprises 45 to 80% by weight of the salt(s) and/or ester(s), from 15 to 45% by weight of the binder and from 5 to 25%, more preferably 10 to 15% by weight of the organopolysiloxane component. It is also preferred that the organopolysiloxane and binder components together comprise from 25 to 45% by weight of the total weight of the salt(s) and/or ester(s). It is also preferred that the weight ratio of salt particles to the combined weight of binder and organopolysiloxane components is the range from 3/2 to 4/1, and that the weight ratio of binder component to organopolysiloxane component is a maximum of 2/1 but is preferably about 3/2.

Although it is preferred that the granulated hydrophobing additives consist only of the salt binder and optionally organopolysiloxane, additional ingredients may be included, for example, viscosity modifiers, surfactants, pigments, colorants, preservatives, gelling agents, pH modifiers, buffers, accelerators, retarders, air entrainers and fillers, e.g. silica and titanium dioxide. It is however preferred that such additional optional ingredients do not comprise more than 5% by weight of the total weight of the additive.

It is essential that the hydrophobing additive is granulated, which means that it has been prepared by a granulation process. In a granulation process the organopolysiloxane component and the water-soluble or water-dispersible binder are deposited in their liquid form onto the salt particles thus forming a free flowing solid powder. Granulation methods have been described in a number of patent specifications including EP 0811584. Any of the granulation processes described in EP 0811584 may be utilised to prepare a hydrophobing additive in accordance with the present invention wherein the hydrophobic salt/ester replace the carrier particles described in EP 0811584.

According to a second aspect of the invention there is provided a cementitious material in powder form comprising cement and sufficient of a granulated hydrophobing additive as described above to render the cementitious material hydrophobic.

The amount of granulated hydrophobing additive which is present in the cementitious material according to the invention is such that from 0.01 to 5% by weight of the salt(s)/ester(s) component is present based on the weight of the cementitious material i.e. about 0.02 to 10% by weight of the granule as typically the overall weight of a typical granule is about 50% salt/ester and about 50% binder and optional organosiloxane. More preferably the amount of salt component is from 0.25 to 5% weight, most preferably from 1.0 to 1.5% by weight of the cement present. It is preferred that the maximum amount of organopolysiloxane material present in the cementitious material is about 2% by weight based on the weight of the cement which is present, most preferably from 0.5 to 1% by weight based on the weight of the cementitious material.

The cementitious material according to the second aspect of the invention may also comprise additional ingredients. These additional ingredients may include sand, filler and other materials traditionally found in cementitious materials, e.g. lime, aggregate, accelerators, air entrainers, pigments, retarders and pozzolanic materials.

Preferably the cementitious material is cement, concrete, mortar or grout or the like.

In a third aspect of the invention, there is provided a process of imparting to cementitious material a hydrophobing character by mixing into the cementitious material a hydrophobing additive in accordance with the first aspect of the present invention. Mixing may be done by mechanical means or any other appropriate method known in the art.

There now follows a number of examples which illustrate the invention. All parts and percentages are given by weight unless otherwise indicated.

EXAMPLE 1

Preparation of Granulated Hydrophobing Additive.

A variety of granulated hydrophobing additives were prepared by way of the following processes.

i) Organopolysiloxane Free Granule 108 g of Emulan 40/60 was preheated to a temperature of 70-75° C., at which temperature it was seen to be molten. 200 g of zinc stearate, having a particle size of about 2 to 5 μm was placed into a domestic kitchen food mixer (Moulinex MasterChef 650), used to simulate a flexomix granulator. The Emulan 40/60 was poured over the zinc stearate at maximum mixer speed within a period of 15-30 seconds resulting in a dry granulated powder. The resulting powder was sieved to remove any particles larger than 1.4 mm diameter.

ii) Organopolysiloxane Containing Granule

Granules containing an organopolysiloxane component were prepared using exactly the same process as described in (i) above apart from the fact that once the Emulan 40/60 had become molten, a high speed disperser was utilized to mix the Emulan 40/60 with 72 g of a silanol end-blocked polydimethylsiloxane, having a viscosity at 25° C. of about 100 mm$^2$/s, for 2 minutes, the resulting mixture being added to the zinc stearate mixture.

EXAMPLE 2

Preparation of the Cementitious Materials

A mixture of 320 g of sand, 220 g of cement and where required zinc stearate powder or the granule in accordance with present invention, were introduced into a Hobart mixer and mixed at speed 1 for 1 minute. 150 g of water was introduced into the mixture over a period of 15 seconds while the mixer speed was maintained at speed 1 and mixing continued for a further 2 minutes.

EXAMPLE 3

The following tests were run on a control sample (containing no hydrophobing agent), two comparative samples C1 and C2 which contained 0.25% and 0.5% by weight of zinc stearate powder (Peter Graven W A) respectively and a sample in accordance with the invention S1 containing 1% by weight of the granule (which equates to approximately 0.5% by weight of zinc stearate, from the same source in the granule.

The dry cementitious powder mixture which had been prepared had sufficient water added thereto and the resulting aqueous mixture for each sample was then poured into a number (typically 12) pre-prepared test piece moulds measuring 100×100×25 mm. The test pieces were removed from their respective moulds after 24 hours and immediately weighed (the demould weight) and allowed to dry in the lab for a further period of between 7 and 28 days at a temperature of between 16 to 24° C. and 40 to 60% relative humidity.

The twelve test pieces were separated into groups of three, A, B, C and D. Test pieces A were weighed after seven days and immersed in water at a depth of 25 mm such that the upper surface of each test piece was dry, i.e. open to the air, for a period of 2 hours. Each test piece was then reweighed and the average water pick up in grams is tabulated in table 1. After 14 days the above was repeated for test pieces A and undertaken for a first time with test pieces B, after 21 days the above test was repeated for A and B and carried out for a first time on test pieces C and after 28 days the same test was repeated for A, B and C and carried out for a first time on test pieces D.

It will be noticed that the control, which contained no zinc stearate, had a significant water take up and that as would be expected the introduction of zinc stearate into the samples significantly reduced water pick up. It is also to be noted that the sample in accordance with the present invention contains approximately 0.5% by weight of zinc stearate and therefore compares very favourably with the 0.5% pure zinc stearate test pieces. It is thought that this may be due to the hydrophilic nature and therefore significantly easier dispersability of the additive in accordance with this invention in the presence of water

TABLE 1

| Test Pieces | No of Days | 2 hour water pick up (g) | | | |
|---|---|---|---|---|---|
| | | Control | C1 | C 2 | S 1 |
| A | 7 | 50.9 | 14.1 | 12.9 | 5.5 |
| | 14 | 41.1 | 9.5 | 7.7 | 7.6 |
| | 21 | 40.8 | 11.3 | 10.2 | 8.3 |
| | 28 | 42.6 | 9.7 | 9.3 | 8.2 |
| B | 14 | 42.5 | 13.9 | 8.3 | 7.6 |
| | 21 | 41.7 | 11.0 | 8.4 | 7.9 |
| | 28 | 38.5 | 10.4 | 7.9 | 8.3 |
| C | 21 | 50.8 | 18.4 | 11.1 | 10.6 |
| | 28 | 37.7 | 14.6 | 7.5 | 8.8 |
| D | 28 | 53.6 | 27 | 17.6 | 13.4 |

EXAMPLE 4

In the following example test pieces were prepared in accordance with the process described in example 3 and granules in accordance with the invention were prepared in accordance with Example 1. The granules in sample S2 were organopolysiloxane free and those in samples S3 and S4 contained organopolysiloxane and samples S3, S4 and S5 contained 2.5%, 2.5% and 5% by weight respectively of the granules in accordance with the present invention. A comparative samples C3 and C4, 2.5% and 5% by weight of granules in accordance with EP 0811584, comprising a calcium hydroxide support, a hydroxy-terminated dimethylsiloxane hydrophobing agent and a fatty acid based binder, were also tested.

Dry blocks were weighed ($W_{dry}$) and then immersed for a period of two hours in water, with the top surface of the block a depth of 5 cm below the water surface. After two hours the block was reweighed ($W_{wet}$). The blocks were then dried and the process repeated on two further occasions. Results in Table 2 are obtained by use of the following equation wherein:—

TABLE 2

$$\text{Percentage Water Pick Up (WPU \%)} = \frac{(W_{wet}) - (W_{dry})}{(W_{dry})} \times 100$$

| Sample Type | First Wetting (% WPU) | Second Wetting (% WPU) | Third Wetting (% WPU) |
|---|---|---|---|
| Control | 8.6 | 9.8 | 8.6 |
| S2 | 1.8 | 4.7 | 5.2 |
| S3 | 4.0 | 2.2 | 1.5 |
| S4 | 3.6 | 1 | 0.9 |
| C3 | 7.5 | 2.5 | 2.7 |
| C4 | 5.9 | 1.5 | 1.6 |

It is to be noted that the water pick up on the cement samples containing the granules in accordance with the present invention give significantly improved initial hydrophobicity results however the samples in accordance with the invention containing both Stearate and silicone gave the best results because it is believed that Stearate component provides the initial hydrophobic activity and the silicone component maintains the hydrophobic properties of the test sample over extended periods of time whilst the effect of the Stearate alone in combination with wax shows a gradual loss of hydrophobicity. It will also be noted that both the initial and later hydrophobic results of the granules in accordance with the present invention are improved over granules as described in EP 0811584.

EXAMPLE 5

In order to further exemplify the hydrophobic nature of the resulting cementitious products the contact angle of a 2 μl droplet of water placed on a control test piece compared with a test piece made containing 5% by weight of granules was undertaken. Test pieces were prepared by the addition of the required amount of water to a dry mix of the cementitious material. The resulting mixture was poured into plastic moulds of circular cross-section having a mean diameter of 65 mm and a depth of 10 mm, and dried.

Contact angle measurements were obtained using an optical bench fitted with a VCA 2000 video camera (Advanced Surface Technology Inc.). A 2 μl droplet of Water was added at the surface a dry test specimen mounted on the optical bench and the contact angle was measured against time until either the drop was absorbed into the surface or had been lost by evaporation. In the case of the control test piece the contact angle was observed to reduce from 76 to 18 degrees in five seconds before being fully absorbed by the test piece, whereas the 2 μl droplet of water placed on the unwetted test pieces comprising granules in accordance with the present invention resulted in a constant contact angle of 104° for over one minute until evaporation. The test pieces were rewetted after drying to determine if changes to the contact angle were a direct result of water contact with the test pieces. It was found that after one rewetting the contact angle had increased to 113° for a period of over 1 minute until the droplet evaporated. It is believed that this increase was caused by the release of silicone into the test piece, thereby causing the continued development of a more water repellent test piece by treatment with water. It is to be understood that the higher the value of the contact angle the more water repellent the surface.

EXAMPLE 6

The following example is provided to show that the incorporation of granules in accordance with the present invention result in a hydrophobic effect throughout a test piece. Hydrophobic particles mixed into dry cementitious material will, upon the introduction of water, migrate away from water, i.e. to a water/air interface prior to the setting of the cementitious material. Hence one tends to find an outer layer of hydrophobic material whereas the main body of the set product is largely devoid of the hydrophobic particles.

Because of the wax component in the granules of the present invention such a problem is not observed as will be seen from the results of the following test which is based on the DIN 52 617 standard test.

Test pieces comprising a control sample and a sample containing 3.5% by weight of granules (S5), were prepared in accordance to the requirements for DIN 52 617 standard test for the Determination of the water absorption coefficient of construction materials'.

The initial weight of each pre-prepared test piece was determined, the edges of the blocks were sealed with molten paraffin wax and the test piece was re-weighed prior to being placed in a plastic tray in accordance with the test protocol. Water was introduced into the tray until the level was about one third of the way up the block so that water can only ingress into the test piece through a single face of the piece. The test piece was reweighed after 1, 6 and 24 hours.

The following test assesses the ingress of water from the opposite main face of the test piece, which would normally be kept dry during the DIN 52 617 test. Exactly the same procedure as described above was carried out on the opposite face.

TABLE 3

| Sample | DIN (24 hrs) | Reverse face (24 hrs) |
|---|---|---|
| control | 0.45 | 1.02 |
| S5 | 0.08 | 0.18 |

It will be noted that on the reverse face both test pieces gave higher results that the standard DIN test but the results for the test piece comprising granules after a period of 24 hours was substantially better than the control test piece.

The invention claimed is:

1. A granulated hydrophobing additive comprising the following components:
    A) from 45 to 90 parts by weight of a material selected from the group consisting of (a) ammonium stearate, (b) sodium stearate, (c) lithium stearate, (d) potassium stearate, (e) magnesium stearate, (f) calcium stearate, (g) barium stearate, (h) zinc stearate, (i) aluminum tri-stearate, (j) aluminum di-stearate, (k) aluminum mono stearate, (l) copper stearate, (m) sodium oleate, (n) potassium oleate, (o) calcium oleate, (p) zinc oleate and (q) butyl stearate;
    B) from 15 to 50 parts by weight of a water-soluble or water-dispersible binder and
    C) from 5 to 25 parts by weight of an organopolysiloxane.

2. An additive in accordance with claim 1 wherein component A) is selected from the group consisting of zinc stearate and calcium stearate.

3. A cementitious material in powder form comprising cement and a granulated hydrophobing additive in an amount sufficient to render the cement hydrophobic, said granulated hydrophobing additive comprising the following components:
    A) from 45 to 90 parts by weight of a material selected from the group consisting of (i) palmitic acid salts of ammonia, (ii) stearic acid salts of ammonia, (iii) oleic acid salts of ammonia, (iv) palmitic acid salts of aluminum, (v) stearic acid salts of aluminum, (vi) oleic acid salts of aluminum, (vii) palmitic acid salts of alkali metals, (viii) stearic acid salts of alkali metals, (ix) oleic acid salts of alkali metals, (x) palmitic acid salts of alkaline earth metals, (xi) stearic acid salts of alkaline earth metals, (xii) oleic acid salts of alkaline earth metals, (xiii) palmitic acid salts of transition metals, (xiv) stearic acid salts of transition metals, (xv) oleic acid salts of transition metals, (xvi) mixtures of (i) to (xv), (xvii) organic esters of palmitic acid, (xviii) organic esters of stearic acid, (xix) organic esters of oleic acid, and (xx) mixtures of (xvii) to (xix);
    B) from 15 to 50 parts by weight of a water-soluble or water-dispersible binder and
    C) from 5 to 25 parts by weight of an organopolysiloxane.

4. A cementitious material in accordance with claim 3 wherein the amount of granulated hydrophobing additive which is present in the cementitious materials according to the invention is such that from 0.01 to 5% by weight of component A) is present based on the weight of cement.

5. A cementitious material as claimed in claim 3 wherein the water-soluble and water-dispersible binder each have at 20 to 25° C., a waxy, viscous or solid consistency and have a melting point of from 25 to 150° C.

6. A cementitious material as claimed in claim 3 wherein the organopolysiloxane component of the hydrophobing additive comprises a majority of di-functional siloxane units having the general formula $R_2SiO_{2/2}$, wherein each R is independently selected from the group consisting of (i) an organic component, (ii) a hydroxyl group, and (iii) a halogen substituent, and wherein a unit selected from the group consisting of tri-functional and tetra-functional siloxane units are present in an amount which does not exceed 10% of the total number of siloxane units.

7. A cementitious material as claimed in claim 3 wherein the organopolysiloxane component of the hydrophobing additive has the general formula

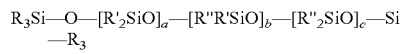

wherein each R substituent is selected from the group consisting of hydroxyl, alkyl, alkenyl, aryl, alkyl-aryl, aryl-alkyl, alkoxy, aryloxy and hydrogen, each R' substituent is selected from the group consisting of hydroxyl, hydrogen, a hydrocarbon group, substituted hydrocarbon group, and OR''' where R''' is a hydrocarbon group with 1 to 6 carbon atoms, each R'' is an organopolysiloxane chain of the formula $O-[R'_2SiO]_x SiR_3$; a is an integer, b, c and x are zero or integers whereby the total of b+c is no more than 5% of the total of a+b+c+x.

8. A cementitious material as claimed in claim 3 comprising from 45 to 80% by weight of a material selected from the group consisting of salt(s) and ester(s), from 15 to 45% by weight of the binder and from 5 to 25% by weight of the organopolysiloxane component.

9. A cementitious material as claimed in claim 3 wherein the organopolysiloxane and binder components of the hydrophobing additive together comprise from 20 to 50% by weight of the total weight of the hydrophobing additive.

10. A cementitious material as claimed in claim 3 wherein the weight ratio of the binder component to the organopolysiloxane component is a maximum of 2:1.

11. A granulated hydrophobing additive comprising the following components:
    A) from 45 to 90 parts by weight of a material selected from the group consisting of (i) palmitic acid salts of ammonia, (ii) stearic acid salts of ammonia, (iii) oleic acid salts of ammonia, (iv) palmitic acid salts of aluminum, (v) stearic acid salts of aluminum, (vi) oleic acid salts of aluminum, (vii) palmitic acid salts of alkali metals, (viii) stearic acid salts of alkali metals, (ix) oleic acid salts of alkali metals, (x) palmitic acid salts of alkaline earth metals, (xi) stearic acid salts of alkaline earth metals, (xii) oleic acid salts of alkaline earth metals, (xiii) palmitic acid salts of transition metals, (xiv) stearic acid salts of transition metals, (xv) oleic acid salts of transition metals, (xvi) mixtures of (i) to (xv), (xvii) organic esters of palmitic acid, (xviii) organic esters of stearic acid, (xix) organic esters of oleic acid, and (xx) mixtures of (xvii) to (xix);
    B) from 15 to 50 parts by weight of a water-soluble or water-dispersible binder and
    C) from 5 to 25 parts by weight of an organopolysiloxane.

12. An additive as claimed in claim 11 wherein the water-soluble and water-dispersible binder each have at 20 to 25° C., a waxy, viscous or solid consistency and have a melting point of from 25 to 150° C.

13. An additive as claimed in claim 11 wherein the organopolysiloxane component of the hydrophobing additive comprises a majority of di-functional siloxane units having the general formula $R_2SiO_{2/2}$, wherein each R is independently selected from the group consisting of (i) an organic component, (ii) a hydroxyl group, and (iii) a halogen substituent, and wherein a unit selected from the group consisting of tri-functional and tetra-functional siloxane units are present in an amount which does not exceed 10% of the total number of siloxane units.

14. An additive as claimed in claim 11 wherein the organopolysiloxane component of the hydrophobing additive has the general formula

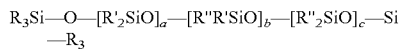

wherein each R substituent is selected from the group consisting of hydroxyl, alkyl, alkenyl, aryl, alkyl-aryl, aryl-alkyl, alkoxy, aryloxy and hydrogen, each R' substituent is selected from the group consisting of hydroxyl, hydrogen, a hydrocarbon group, substituted hydrocarbon group, and OR''' where R''' is a hydrocarbon group with 1 to 6 carbon atoms, each R'' is an organopolysiloxane chain of the formula $O-[R'_2SiO]_x SiR_3$; a is an integer, b, c and x are zero or integers whereby the total of b+c is no more than 5% of the total of a+b+c+x.

15. An additive in accordance with claim 14 wherein each R' is a methyl or ethyl group and b, c and x are zero.

16. An additive as claimed in claim 11 comprising from 45 to 80% by weight of a material selected from the group consisting of salt(s) and ester(s), from 15 to 45% by weight of the binder and from 5 to 25% by weight of the organopolysiloxane component.

17. An additive as claimed in claim 11 wherein the organopolysiloxane and binder components of the hydrophobing additive together comprise from 20 to 50% by weight of the total weight of the hydrophobing additive.

18. An additive as claimed in claim 11 wherein the weight ratio of the binder component to the organopolysiloxane component is a maximum of 2:1.

19. A method of hydrophobing a cementitious material, the method comprising adding to the cementitious material a granulated hydrophobing additive as claimed in claim 11.

* * * * *